UNITED STATES PATENT OFFICE.

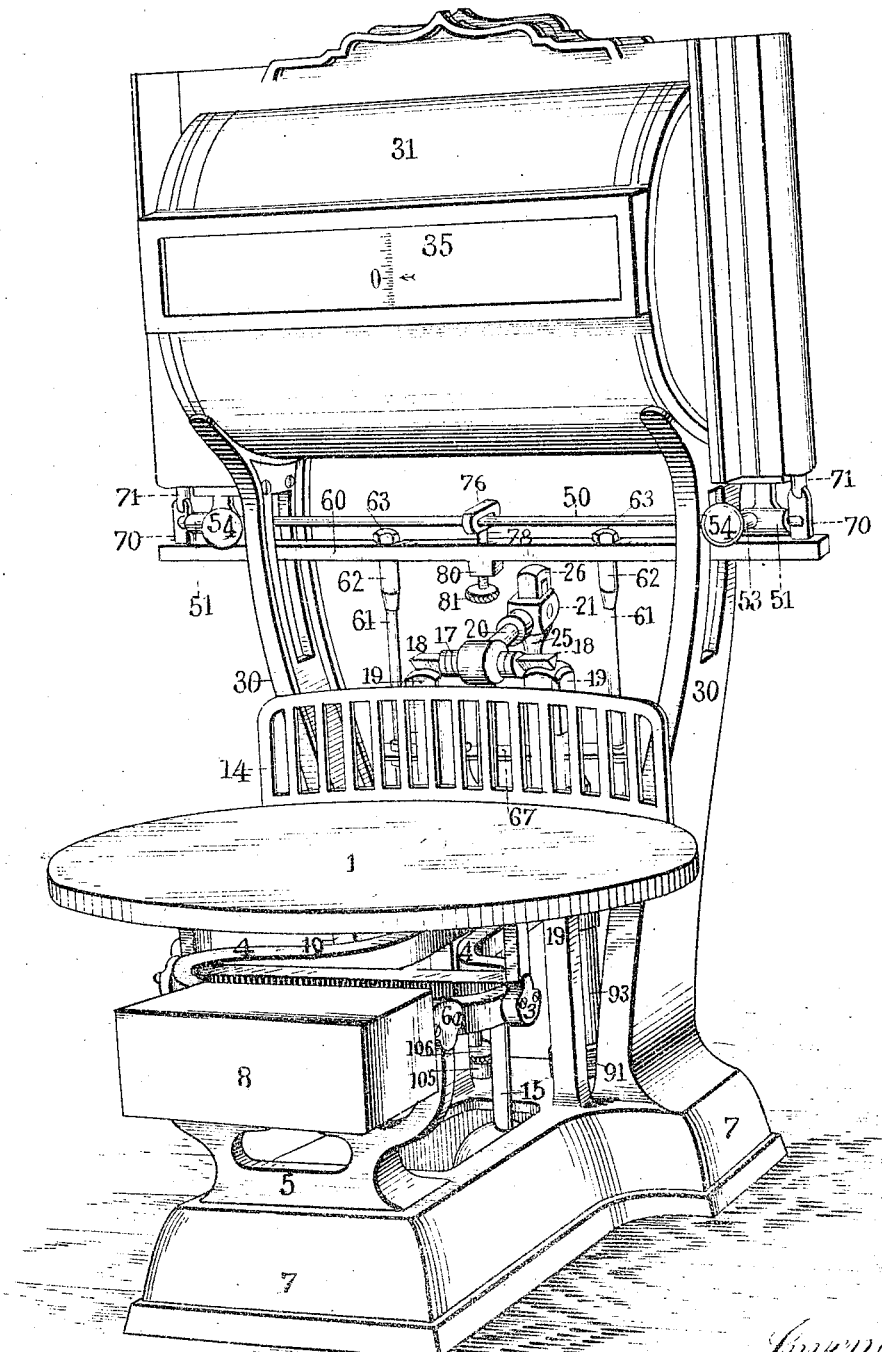

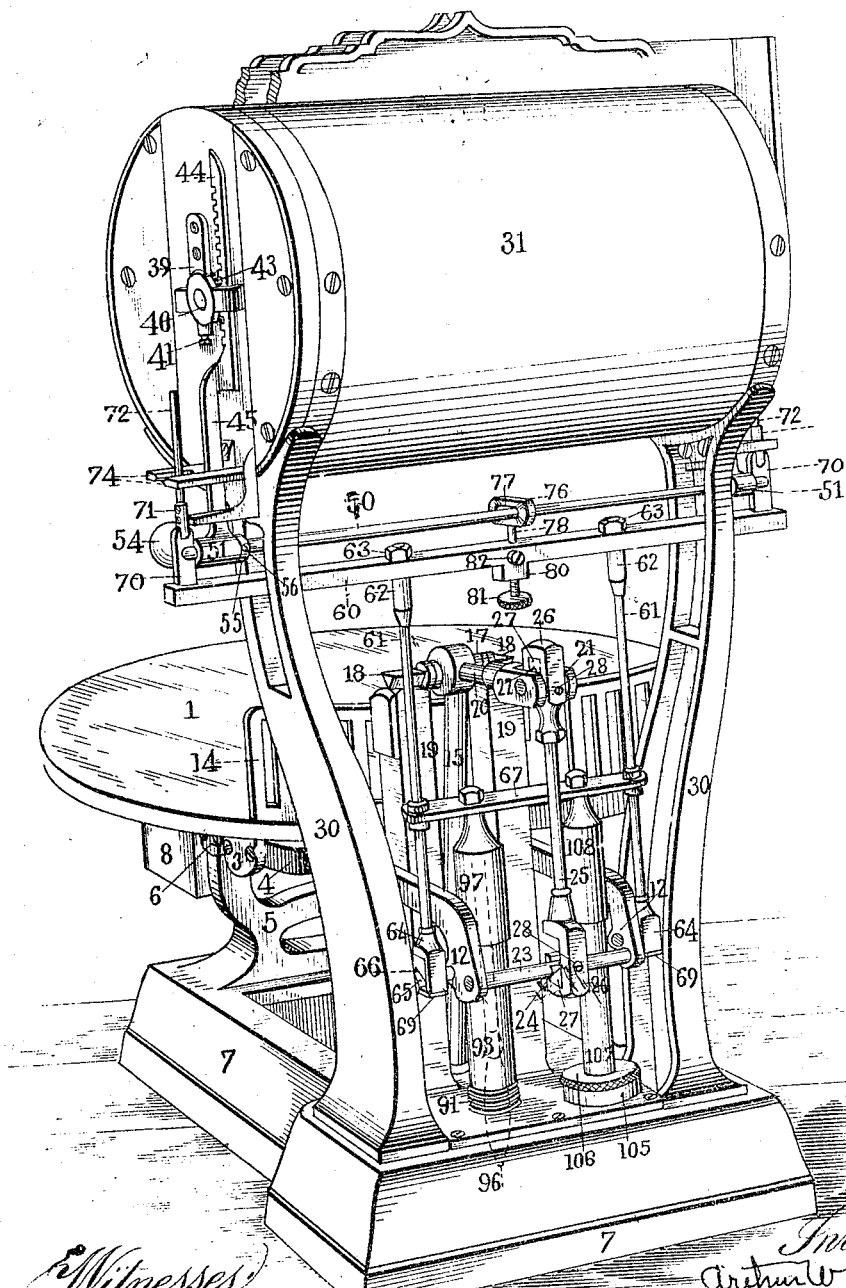

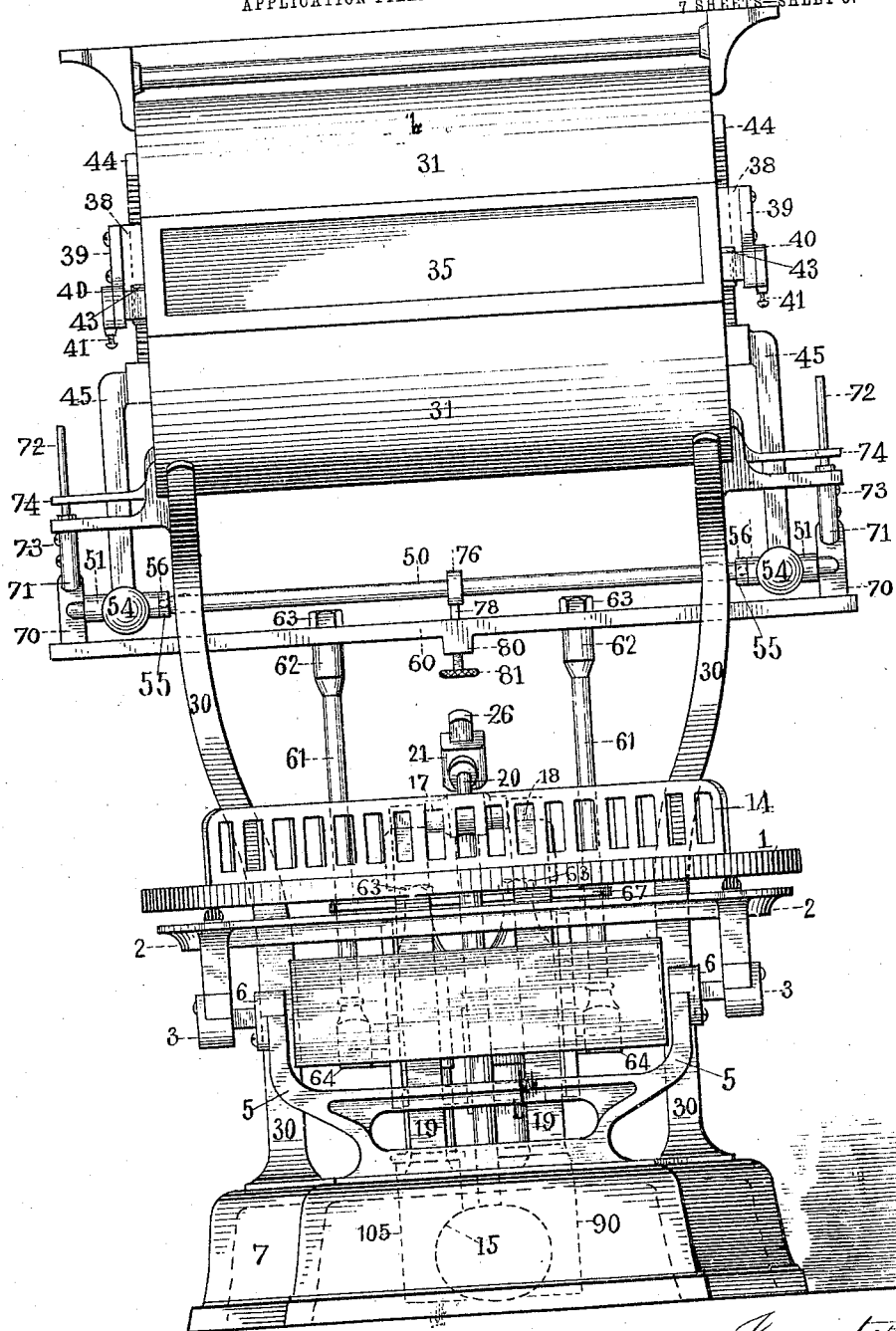

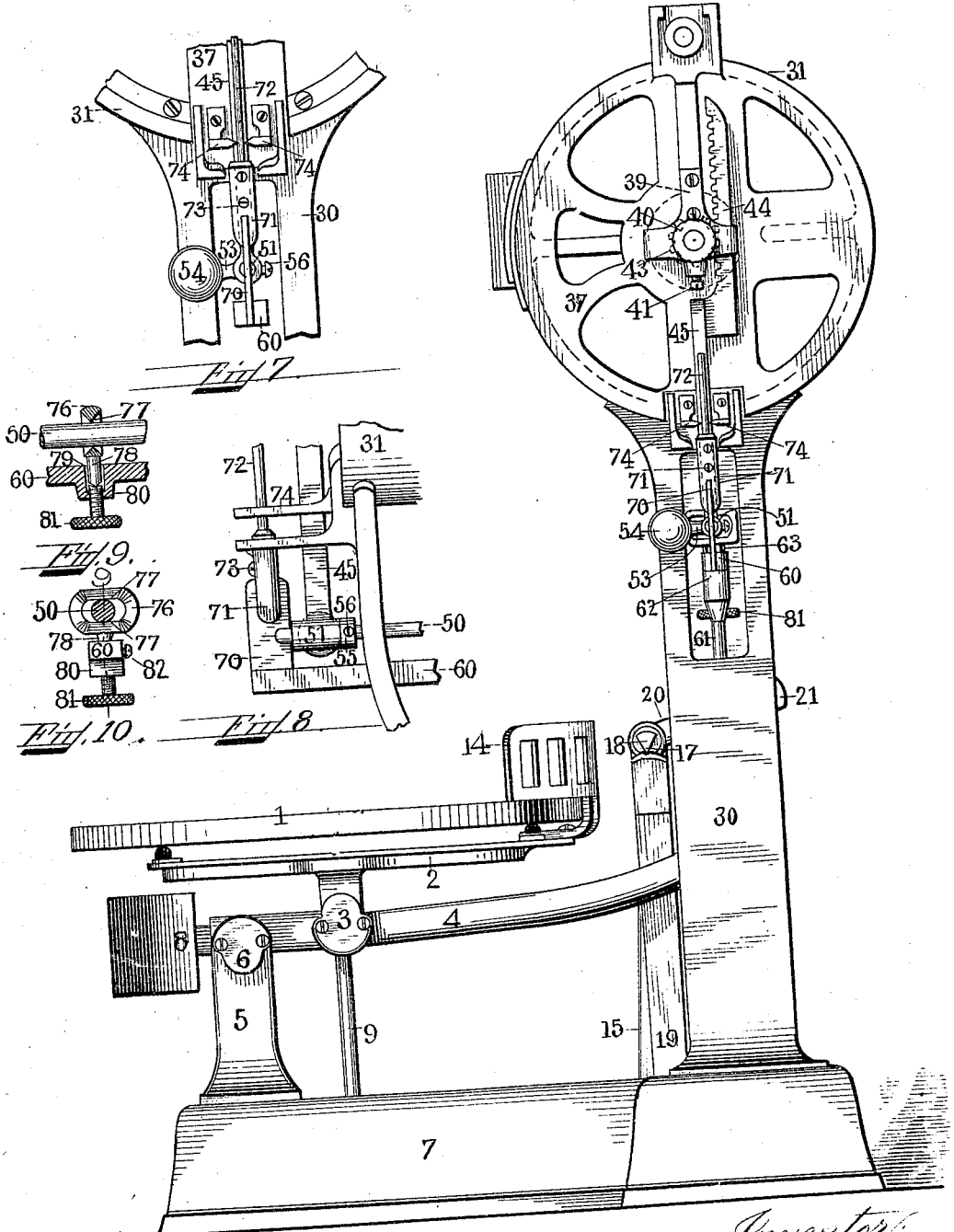

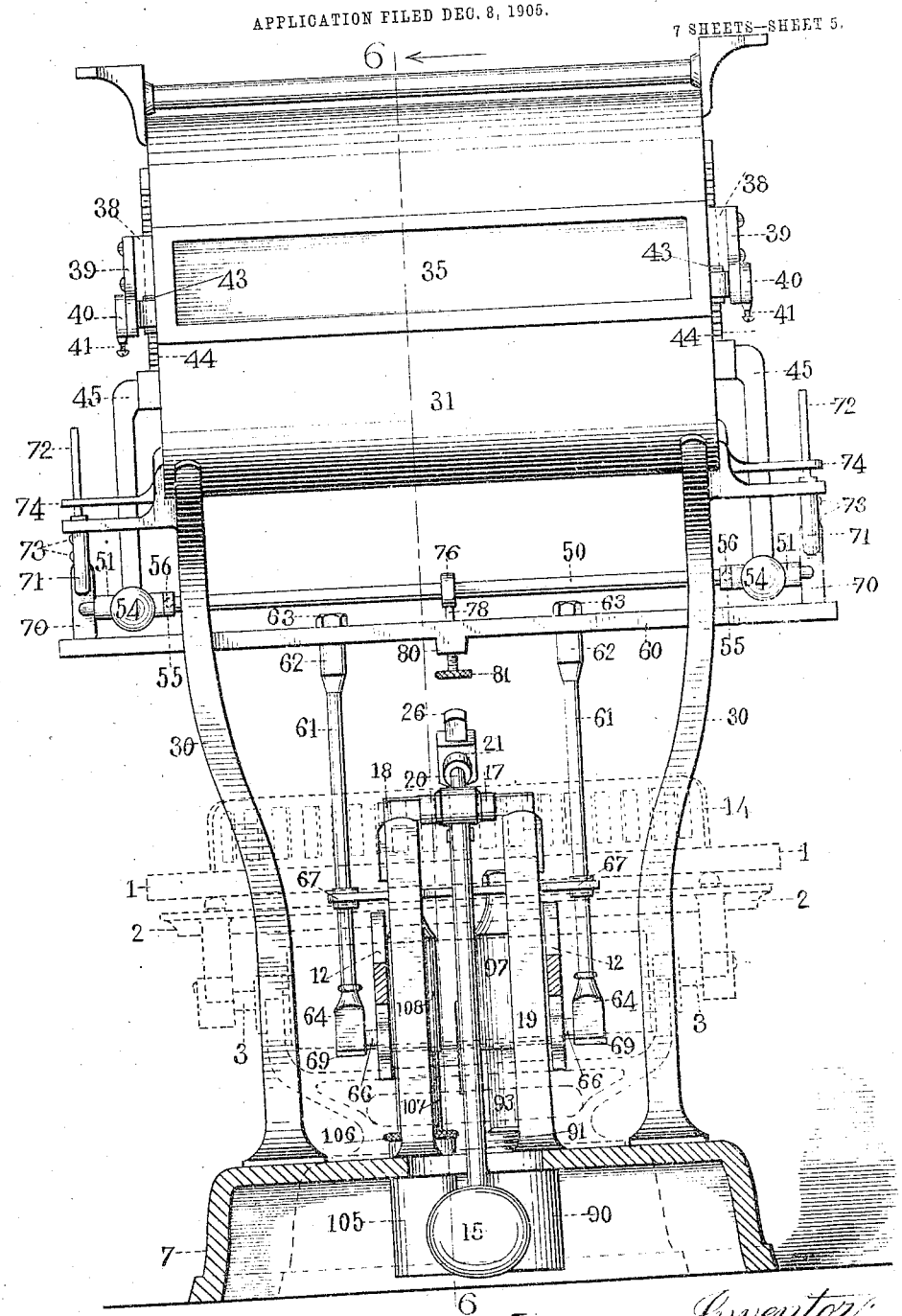

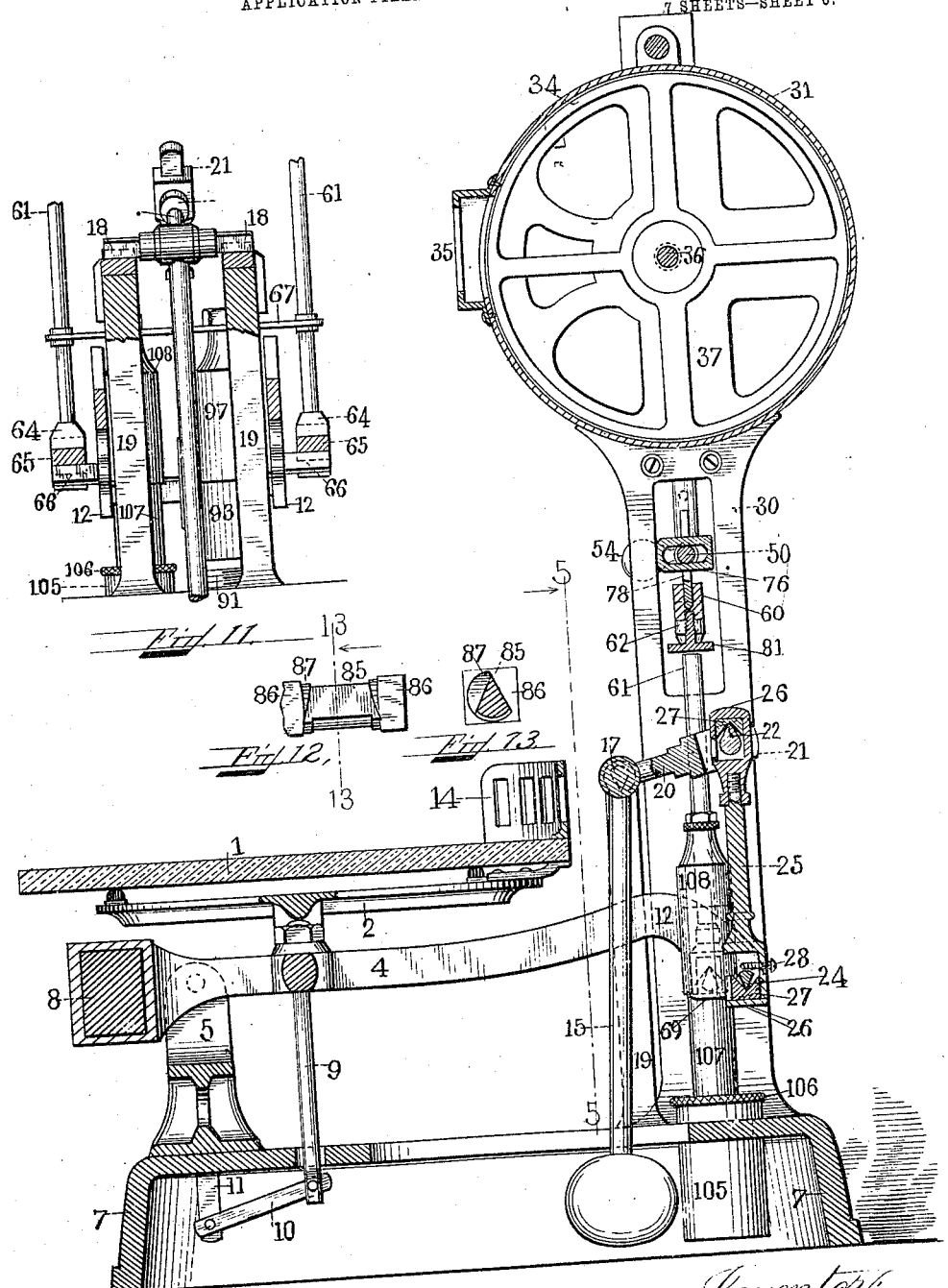

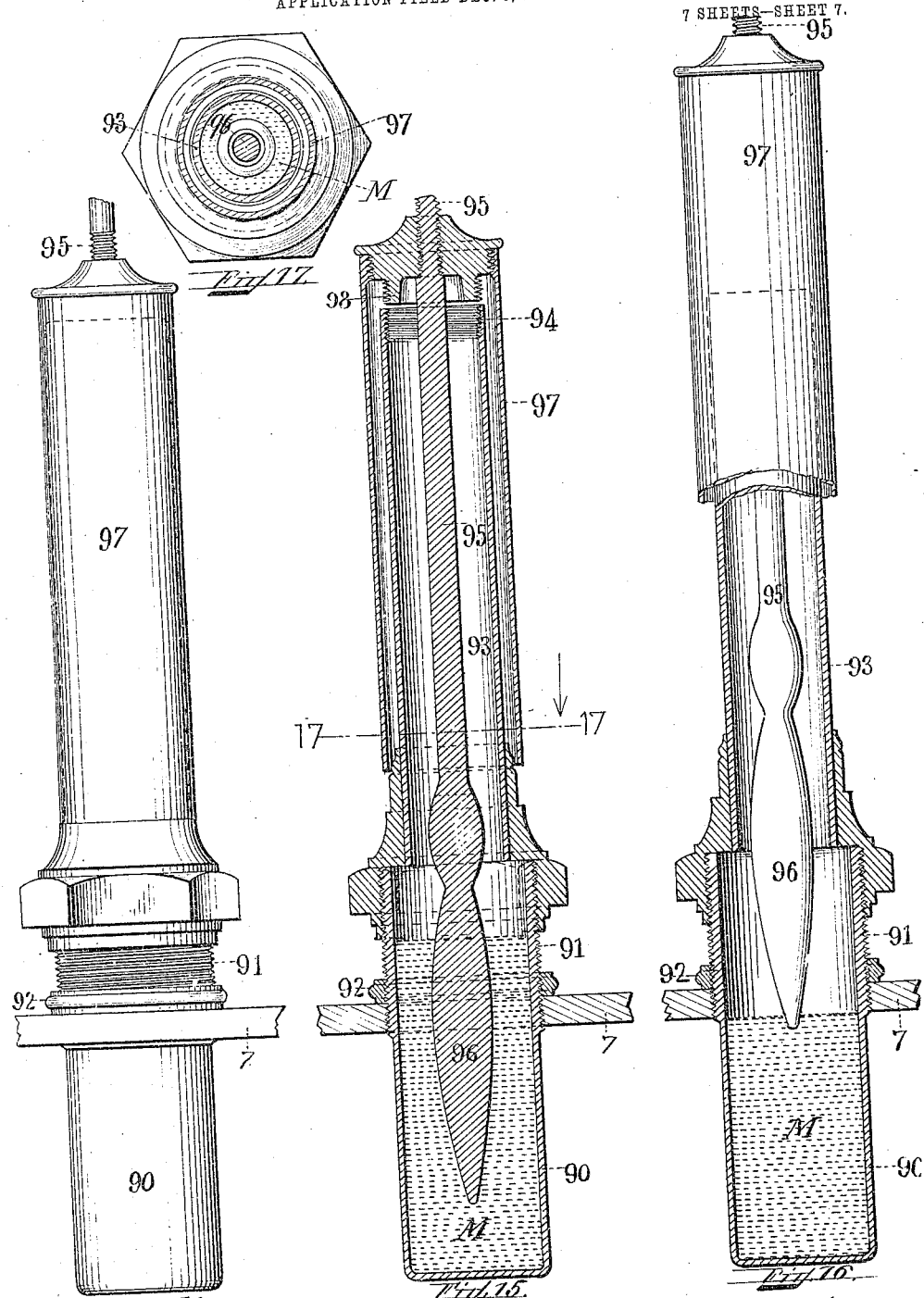

ARTHUR W. BARNARD, OF NEWTON CENTER, MASSACHUSETTS, ASSIGNOR TO THE BARNARD COMPANY, OF BOSTON, MASSACHUSETTS, A CORPORATION OF MASSACHUSETTS.

WEIGHING-SCALE.

No. 842,131.     Specification of Letters Patent.     Patented Jan. 22, 1907.

Application filed December 8, 1905. Serial No. 290,902.

*To all whom it may concern:*

Be it known that I, ARTHUR W. BARNARD, a citizen of the United States, residing at Newton Center, in the county of Middlesex and State of Massachusetts, have invented a new and useful Improvement in Weighing-Scales, of which the following is a specification, reference being had therein to the accompanying drawings.

My invention relates to certain new and useful improvements in weighing-scales generally, and is hereinafter shown and described as applied particularly to that class of weighing-scales whereon the weight and selling price of a commodity are shown without requiring any mental calculation on the part of the weigher. Heretofore this class of scales has been operated by springs, the use of which, owing to the fact that the tension of springs is changed by variations in temperature, long use, and other conditions, has made it practically impossible to produce a scale which will remain accurate for any considerable period of time. Furthermore, in drum-scales where two springs are employed, one on each side of the drum, there is a constant change from long and continued use in the tension of each spring, and as these changes are not generally equal in the two springs, there is a consequent tilting of the equalizing-bar when the scale is operated, which further tends to make the scale inaccurate. Many devices have been constructed for such scales for the purpose of compensating for the variation in the tension of the springs due to change in temperature; but no device has yet been made which will compensate for the change in the springs due to continued use, and therefore it becomes necessary to readjust such scales from time to time to make up for the tensional change in the springs.

The object of my invention is to provide a scale which is always uniform and accurate and which is not affected by changes in temperature, long and continued use, or any other conditions, and I accomplish this result by discarding the springs now used in such scales and substituting therefor a pendulum device. In this connection I have found it necessary to provide means whereby the pendulum will always move the same distance to indicate a given weight. In cases where a pendulum is used for operating a scale and weight is indicated by the movement of the pendulum it has been found that the force required to swing the pendulum upwardly from a vertical position toward a horizontal position does not increase in proportion to the length of the arc through which it is swung, but increases at certain points much more rapidly than at other points—that is, the force required to swing a pendulum upwardly from a vertical to a horizontal position shows a variable and not a constant increase. For this reason where the pendulum is connected to a dial and the hand on the dial is moved in proportion to the movement of the pendulum it has been necessary to mark the dial with graduations of varying size to correspond to the movement of the pendulum. For instance, a force of one pound might move the pendulum to one side from a vertical position through an arc of ten degrees, whereas if the pendulum was in an oblique position the same force applied would move it through an arc of only two or three degrees. Therefore the use of a pendulum in the place of springs would involve a marking of the indicating drum or dial with graduations of varying size to correspond with the movement of the pendulum; but as it is preferable for the sake of accuracy to have the drum or dial marked with equal graduations I provide means which compensate for the variable movement of the pendulum and cause the pendulum to move in proportion to the weight.

Broadly, my invention comprises a scale in which the beam is operated by a pendulum, together with indicating means operatively connected to the scale-beam and means whereby the pendulum is moved uniformly.

Although my invention is herein shown as applied to a drum-scale, yet I do not wish to limit myself to that class of scales, as my invention with slight changes of construction may be adapted to other forms of scales than that illustrated in the drawings.

In the drawings, which illustrate my device applied to one form of scales, and in which similar numbers refer to similar parts throughout the several views, Figure 1 is a front view in perspective of a scale embodying my invention. Fig. 2 is a rear view in perspective of the same. Fig. 3 is a front elevation of the same. Fig. 4 is a side elevation. Fig. 5 is a vertical sectional view on line 5 5 in Fig. 6. Fig. 6 is a longitudinal vertical sectional view on line 6 6 in Fig. 5. Fig. 7 is an end elevation of a detail. Fig. 8 is a side elevation of the same. Fig. 9 is a vertical longitudinal sectional view of the regulating device on line 9 9 in Fig. 10. Fig. 10 is a side elevation of the regulating device. Fig. 11 is a front elevation, partly in section, of the upper portion of the pendulum and mechanism in the rear. Fig. 12 is a side elevation of a portion of a bar provided with knife-edges, and Fig. 13 is a transverse sectional view of the same on line 13 13 in Fig. 12. Fig. 14 is a side elevation of the plunger device, which regulates the movement of the pendulum, the same being locked. Fig. 15 is a vertical sectional view of the plunger device, the plunger being shown in a depressed position. Fig. 16 is a view, partly in side elevation and partly in section, of the plunger device, the plunger being shown in a raised position; and Fig. 17 is a cross-sectional view of the plunger device on line 17 17 in Fig. 15.

In applying my invention to the form of scale hereinafter described and illustrated I retain many features of construction which are old and well known in the scale art. The new features, which are described in detail hereinafter, are briefly as follows: I provide a pendulum properly mounted and operatively connected to the scale-beam to offset the weight upon the scale-platform. To regulate the movement of said pendulum and cause it to swing in proportion to the weight on the scale-platform, a plunger device is provided and so mounted that it will offer a resistance to the movement of the pendulum just sufficient to overcome the variations in its movement and cause the pendulum to move uniformly. Further, the mechanism operating the indicating device is mounted upon and supported by the end of the scale-beam in such manner that when the scale-beam is depressed by weight the operating mechanism follows it downwardly, thus preventing the lost motion, which is always present to a greater or less degree in scales where the indicator-operating mechanism is supported otherwise and is operated by being pulled by the scale-beam against spring or other tension.

In the first place my method of adapting the pendulum to the herein-described form of scales is as follows: In the drawings, 1 represents a platform supported on a frame 2, which in turn is supported upon knife-edge bearings 3 on a beam 4, pivoted on knife-edge bearings 6 on a standard 5 on a base 7, said beam 4 being provided with an equalizing or balance weight 8 on its forward end. The downwardly-depending rod 9, fixed to the frame 2, is pivotally attached at its lower extremity to a check-bar 10, the latter being pivotally connected to a depending fixed bracket 11, said rod and check-bar serving to keep the platform 1 horizontal when the beam 4 is moved. The beam 4 is loop-shaped, having its two ends 12 extending rearwardly and the loop portion turned toward the front of the scale. 14 is a platform guard or grille. All of the foregoing is of ordinary and well-known construction. For the purpose of counterbalancing the weight on the scale-platform I provide a pendulum 15, hung on a spindle 17, which rotates on knife-edge bearings 18 between standards 19, which rise from base 7. This pendulum 15 swings outwardly toward the front of the scale in a prescribed and limited arc. It will be noticed that in Fig. 6 the pendulum is shown as hanging a trifle out of the vertical, which is caused by the weight of the mechanism on the scale-beam being offset by the pendulum. To connect the pendulum 15 to the ends 12 of the scale-beam 4 in order to counterbalance the weight on the platform 1, the spindle 17 has fixedly mounted thereon a lever 20, extending rearwardly and upwardly, said pendulum, spindle, and lever all being fixed in relation to each other and all moving in unison. The free end 21 of lever 20 is forked, and the fork carries a knife-edge bearing 22. The beam-arms 12 12 are connected by a cross-rod 23, provided with a centrally-disposed knife-edge bearing 24. The lever 20 and the scale-arms 12 12 are connected by a vertical rod 25, having on each end a hook or loop 26, within which is mounted a bearing-surface 27, adapted to engage the knife-edges in the end of the lever 20 and on the cross-rod 23. As the knife-edge 22 is turned upwardly, the upper bearing 27 faces downwardly and the knife-edge 24 between the beam-arms 12 is turned downwardly and engages the bearing 27, which is faced upwardly. Set-screws 28 serve to keep the knife-edges 22 and 24 from jumping away from their bearings and out of the loops 26 when the scale is operated suddenly or jarred. The lever 20 and the beam-arms 12 may be disconnected by unscrewing the set-screws 28 and removing the rod 25. This construction is fully illustrated in Fig. 6.

The above method of adapting the pendulum to the scale-beam may be applied to other forms of scales without any essential changes in construction.

Arising from the base 6 are standards 30 30, supporting a casing 31, within which rotates a drum 34 of suitable form, adapted to carry a dial 35, suitably marked. This construction is also old and well-known in the scale art. The said drum 34 is mounted upon a shaft 36, which is journaled at each end in suitable bearings. The casing 31 has skeleton end plates 37, upon each of which is fastened a lug 38, to which is adjustably attached a depending bracket 39, carrying a ball-bearing retainer 40, held by a set-screw 41. Upon either end of shaft 36 is mounted a pinion 43, adapted to enmesh with a rack 44 on a rack-bar 45. The two rack-bars 45 45 are connected beneath the casing by an adjustment-rod 50, each end of which is loosely journaled in the lower part of the rack-bar 45, which expands to form a collar 51. Upon one side of said collar is a transverse arm 53, carrying a ball or weight 54, which acts as a counterweight to tilt the rack-bar 45 forward and retain it in close engagement with pinion 43. To prevent lateral movement of the rack-bar 45 on the adjustment-rod 50, a collar 55, held by a set-screw 56, is placed on one side of the collar 51, the latter abutting on the other side against a plate, hereinafter described. (See Figs. 7 and 8.)

In the foregoing construction the drum is operated by the vertical movement of the rack-bars 45, the latter being operated by the scale-beam through the following-described means: At this point there is a radical difference between my scale and those heretofore in use and operated by springs. In the latter class of scales the drum has been rotated by the scale-beam pulling the rack-bars downwardly against the tension of the springs. This mode of operation is, however, open to the objection that there is always present a certain amount of lost motion. In my device, on the contrary, the drum-operating mechanism is balanced on knife-edge bearings upon the scale-beam and follows the downward movement of the scale-beam to operate the drum. When the scale-beam returns to its normal position, the drum-operating mechanism is pushed upwardly by the beam. By means of these changes I am enabled to eradicate all lost motion and to operate the drum whenever there is the slightest downward movement of the scale-beam. This portion of my invention comprises a frame consisting of an upper longitudinal bar 60, having two depending rods 61, the upper ends of which pass through the bar 60 and are fixedly secured thereto by means of a shoulder 62 on each rod 61, which engages the under surface of the bar 60, and by a nut 63 on the end of each rod 61 on the upper side of said bar 60. The lower end of each rod 61 is split to form a fork 64, within which is set a downwardly-turned bearing-surface 65, adapted to rest upon a knife-edge 66, set transversely in the end of the scale-arm 12. The rods 61 are so placed as to include between them the scale-beam ends 12 12. About midway a transverse bar 67 connects the two rods 61 and serves to hold them in position and in addition to carry the plunger and dash-pot mechanisms. The frame just described is so disposed as to move in the same vertical plane with the rack-bars 45 and adjustment-rod 50. To secure this movement in the same plane, upon each end of the bar 60 is fixed an upwardly-extending plate 70, which engages a split end of the adjustment-rod 50, and thereby prevents the bar 60 or the adjustment-rod 50 changing their relative lateral adjustment. On the upper portion of each plate 70 is mounted an upright hollow tube 71, adapted to hold an upright rod 72, held therein by screws 73 73. This rod 72 serves as a vertical guide by moving upwardly and downwardly with the bar 60 between knife-edge bearings 74, adjustably mounted upon end casings 37, the object of this construction being to retain said frame at all times in a perpendicular position, and thereby prevent any swinging movement. In order to adjust the said frame and the adjustment-rod 50 to each other, I provide the following device, although for this purpose any suitable means may be employed, since it is not one of the novel features of my invention. In the center of the adjustment-rod 50 is mounted transversely a rectangular link 76, having its horizontal sides beveled to form knife-edge contacts 77 with the adjustment-rod. (See Figs. 9 and 10.) The rectangular form of the link permits of a limited horizontal movement. From the lower side of this link is a downwardly-extending lug 78, loosely engaging a bore 79 in the rod 60. The latter at this point is provided with an extension 80 on its under side in order to receive and hold a screw-nut 81, which regulates the position of the adjustment-rod 50, the lower end of the lug 78 resting upon the point of said screw-nut 81. A set-screw 82 engages the lug 78 to prevent it drawing out of the bore 79 after adjustment. By means of this device I am enabled at all times to raise or to lower the drum-operating mechanism in relation to the bar 60 and frame, which is supported by the scale-beam, and thereby regulate the relation of dial and scale-beam.

In Figs. 12 and 13 is shown, on an enlarged scale, a knife-edge of identical form with knife-edges 22, 24, and 66, this form being designed especially to prevent any lateral movement of the knife-edge on the bearing-surface and to secure this result without appreciable friction. In these figures, 85 indicates the knife-edge, and 86 the rod on which the knife-edge is cut. Ordinarily the forming of a knife-edge in the bar 86 would result in transverse faces being formed on either side of the knife-edge, which faces would tend to contact the side of the bearing-surface and cause friction. To avoid this, I form an undercut shoulder or projection 87 at each end of the knife-edge, the point of said projection 87 extending slightly above the knife-edge, and thus forming a knife-edge point which engages the bearing-surface and prevents lateral movement without friction.

As heretofore explained, the pendulum in this device, like all pendulums, moves in an arc and requires a variably-increasing force to move it a unit of distance as it swings away from a vertical position. If this were not corrected, it would be necessary to mark the indicating device with graduations of various size; but in order to correct the irregular movement of the pendulum and cause it to move in regular steps in proportion to the weight I provide the following device, which is illustrated in detail in Figs. 14, 15, 16, and 17. On the rear of the scale and directly under the frame I mount a hollow cylinder 90, open at the top and adapted to contain mercury M or other suitable fluid. This cylinder 90 has on its upper exterior surface a screw-thread 91, which engages a screw-thread in the upper portion of the base 7 and permits the cylinder to be adjusted vertically in relation to the base of the scale. A check-nut 92 secures the cylinder in position after adjustment. To the top of the cylinder is screwed an upright tube 93 of a diameter smaller than that of the cylinder and provided on its upper interior circumference with a screw-thread 94. Depending from the cross-bar 67 and fixedly mounted thereon is a plunger-rod 95, carrying a plunger 96 and adapted to move upwardly and downwardly in said cylinder 90 and tube 93 without contacting the sides thereof. The upper part of said plunger-rod 95 is provided with a screw-thread to carry a depending hood 97, which is of a diameter sufficient to inclose the tube 93 without contacting it. From the interior underneath surface of the top of said hood is a circular flange 98, having a screw-thread on its outer circumference which is adapted to engage the screw-thread 94 on the tube 93. When the apparatus is being moved or transported, the hood 97 is screwed down and the flange 98 closes up the tube 93, which prevents the mercury or other liquid in the cylinder from leaking out. In Fig. 14 the device is shown locked and ready for transportation.

In Fig. 15 the plunger is shown in a lowermost position and in Fig. 16 in its highest position. The shape of the plunger is a very important consideration, as the plunger must be of such form that it will exactly compensate for the otherwise variable movement of the pendulum, and therefore cause it to move uniformly. By "uniform movement" as applied to the pendulum I mean that a given weight will always move the pendulum a given distance irrespective of the position of the pendulum when the given weight is applied. Thus a weight of one pound will always cause the pendulum to move through a certain arc, whether the pendulum be hanging vertically or be in a raised position when the weight is applied.

It has been demonstrated by experiment that in the form of scales herein shown and with the same arrangement and relation of the various parts thereof the plunger should be of the shape herein illustrated; but the form of the plunger will depend upon various details of construction obvious to those skilled in the art.

To reduce the oscillations of the scale-beam, a dash-pot device of any ordinary construction may be mounted on the rear of the scale beside the plunger device. In the dash-pot shown in the drawings, 105 is the cylinder containing a liquid, 106 a screw-top, 107 a tube extending upwardly from said top, and 108 a hood attached to the cross-rod 67 to prevent the entrance of dust or dirt into the cylinder. The interior construction is similar to the ordinary dash-pot, and the piston-rod is attached to the cross-rod 67.

In operation my invention works simply and efficiently. When the article to be weighed is placed upon the platform 1, the latter is depressed and the scale-arms 12 12 move downwardly and through the medium of the rod 25 and lever 20 swing the pendulum 15 outwardly and upwardly until it counterbalances the load on the platform. The knife-edge bearings at the various points of contact reduce the friction to a minimum. As the scale-arms 12 12 are depressed by the load on the platform the frame composed of bars 60 and 61, together with the drum-operating mechanism, all being supported upon the scale-arms 12 12, drops with them and thereby operates the drum. The racks 44 as they move downwardly turn the pinions 43, and thereby rotate the drum 34, which carries the dial. At the same time the plunger 96 is forced downwardly into the mercury M, which offers an additional resistance to the depression of the scale-arms under the load. When the scale-beam is evenly balanced—that is, when there is no load upon the platform 1 and the dial is at zero—the point of the plunger 96 should just penetrate the surface of the mercury in the cylinder 90. In this connection I prefer to use mercury, since its high specific gravity enables me to use a much smaller plunger than would be required if glycerin or other similar liquid were employed. I have heretofore explained that the pendulum 15 when not operated in connection with my plunger device under the influence of uniform increments to the weight upon the scale platform or pan moves through successively shorter arcs. A uniform increment to the weight on the scale-platform or scale-pan adds a diminishing increment to the arc of travel of the pendulum. I have postulated the requirement that the pendulum shall move through equal arcs for equal increments to the weight on the scale-pan, and in order to accomplish this I have provided the plunger device, which renders the increments to the arc of travel of the pendulum uniformly proportional to increments on the weight on the scale-pan.

Laying aside the actual construction of the machine, it will be observed that its principle is founded upon the fact that the submergence of the plunger is by increments intended to offset the decreasing increments to the arc of travel of the pendulum. It is to be observed, of course, in a practical embodiment of the device the weight and arrangement of the parts, the varying efficiency of the levers, and other features of construction modify the shape of the plunger widely; but any person skilled in the art of making scales from information contained herein would be enabled to carry out the present invention in many different embodiments.

By having the cylinder 90 adjustable vertically by means of screw-thread 91 the scale may be corrected at any time by the user. In order to do this, the user first sets the dial at zero by means of the regulating device connected to adjustment-rod 50 and rod 60. Then, for example, a ten-pound weight is placed on the platform, and if the dial registers more than ten pounds the cylinder 90 is raised in order that the plunger 96 may be immersed to a greater extent. If, on the contrary, the dial shows less than ten pounds, the cylinder is then lowered until the dial registers exactly ten pounds. When the cylinder has been so adjusted, then the scale is correct and remains so until disturbed by accident or otherwise.

The present invention is not limited to the embodiment illustrated in the drawings; but it may be embodied in other and widely-different forms.

Where in the following claims I have employed the term "plunger device," I have intended to define a construction employing a part adapted to be submerged more and more as the pendulum is raised irrespective of the particular form of such device.

What I claim is—

1. A scale, having in combination, a scale-pan, a pendulum-counterbalance and a correcting device connected therewith to cause said pendulum to move through arcs proportional to the weight on the scale-pan; said correcting device comprising a receptacle containing liquid and a submersible member.

2. In a scale, the combination of a scale-pan, an automatic counterbalancing device, and a plunger device to cause said counterbalancing device to move a distance proportional to the weight on the scale-beam; said plunger device consisting of a receptacle containing liquid and a submersible member.

3. In a scale, the combination of a scale-beam, counterbalancing means operatively connected to said scale-beam, and a plunger device to cause said counterbalancing means to move in equal steps when equal increments of weight are placed on the scale-beam; said plunger device comprising a receptacle containing liquid and a submersible member.

4. In a scale, the combination of a scale-beam, a pendulum operatively connected thereto, and a plunger device whereby the pendulum is caused to move a distance proportional to the weight on the scale-beam; said plunger device comprising a receptacle containing liquid and a submersible member.

5. In a scale, the combination of a pendulum, weight-indicating means, and a plunger device to cause said pendulum to move a distance proportional to the weight applied; said plunger device comprising a receptacle containing liquid and a submersible member.

6. In a scale, the combination of a scale-beam, a pendulum operatively connected thereto, indicating means, and a plunger device to cause said pendulum to move a distance proportional to the weight on the scale-beam; said plunger device comprising a receptacle containing liquid and a submersible member.

7. The combination of a scale-beam, a pendulum operatively connected to said beam, an indicator, means whereby said indicator is operated by said beam, and a plunger device to cause said pendulum to move a distance proportional to the weight on the scale-beam; said plunger device comprising a receptacle containing liquid and a submersible member.

8. In a scale, the combination of a scale-beam, a pendulum, means connecting said pendulum and said scale-beam whereby the weight on the scale-platform is counterbalanced by said pendulum, and a plunger device to cause said pendulum to move in proportion to the weight on the said scale-platform; said plunger device comprising a receptacle containing liquid and a submersible member.

9. The combination of a scale-beam, a pendulum operatively connected to said scale-beam, a rotatable drum provided with a dial, means to operate said drum, and a plunger device to cause said pendulum to move in proportion to the weight; said plunger device comprising a receptacle containing liquid and a submersible member.

10. In a scale, the combination of a scale-beam, a pendulum operatively connected to said scale-beam, a rotatable drum provided with a suitable dial, means whereby said drum is operated by the scale-beam, and a plunger device to compensate for the otherwise variable movement of said pendulum and to cause it to move uniformly; said plunger device comprising a receptacle containing liquid and a submersible member.

11. In a scale, the combination of a scale-beam, a pendulum operatively connected to said scale-beam, a drum carrying a dial, means whereby said drum is operated by said scale-beam to indicate the weight and price of the object being weighed, and a plunger device to compensate for the otherwise variable movement of said pendulum; said plunger device comprising a receptacle containing liquid and a submersible member.

12. In a scale, the combination of a scale-beam, a pendulum operatively connected to said scale-beam, a rotatable drum to indicate weight and price, a frame supported on the end of said scale-beam and provided with means to operate said drum, and a plunger device to regulate the movement of said pendulum.

13. In a scale, the combination of a scale-beam, a pendulum operatively connected to said scale-beam, a rotatable drum to indicate weight and price, means supported on the end of said scale-beam to operate said drum, and means to compensate for the otherwise variable movement of said pendulum and to cause said pendulum to move in equal steps when equal increments of weight are placed upon the scale.

14. In a scale, the combination of a scale-beam, a pendulum, means connecting said pendulum to said scale-beam, a drum, a frame supported on said scale-beam and provided with means to operate said drum, and means to compensate for the otherwise variable movement of said pendulum and to cause said pendulum to move in equal steps when equal increments of weight are placed upon the scale.

15. In a scale, the combination of a scale-beam, a pendulum fixedly mounted upon a spindle which rotates in suitable bearings, a lever also mounted upon said spindle and having its free end connected to the scale-beam, a drum rotatably mounted on a shaft and suitably marked to indicate weight and price, said shaft, a spindle mounted on each end of said shaft, rack-bars enmeshing with said spindles, a rod connecting said rack-bars, a frame supported on said scale-beam, adjustable means connecting said rod and said frame, and means to compensate for the otherwise variable movement of said pendulum and to cause said pendulum to move in equal steps when equal increments of weight are placed upon the scale.

16. In a scale, the combination of a scale-beam, a pendulum operatively connected thereto, a rotary drum carrying a dial to indicate weight and price, operating means, a frame supported on the end of said scale-beam and carrying said operating means, means for adjusting the relation of said operating means and said frame to each other, a vertically-adjustable cylinder adapted to contain mercury or other suitable liquid, and a plunger suspended from said frame and adapted to be immersed in said liquid when the scale-beam is depressed, the configuration of said plunger being such that it compensates for the variation in the movement of said pendulum and causes it to move in equal steps when equal increments of weight are placed upon the scale.

17. In a scale, the combination of a scale-beam, a pendulum device operatively connected to the said scale-beam to counterbalance the load thereon, a rotary indicator provided with pinions, rack-bars enmeshing with said pinions, a frame supported on the end of said scale-beam, adjustable means connecting said rack-bars to said frame and a plunger device to cause said pendulum device to move in equal steps when equal increments of weight are placed upon the scale.

18. In a scale, the combination of a scale-beam, a pendulum mounted in suitable bearings and operatively connected to said scale-beam, a rotary indicator, pinions on the shaft of said indicator, rack-bars enmeshing with said pinions, a frame supported on knife-edge bearings upon the end of said scale-beam, said knife-edge bearings and adjustable means connecting said rack-bars and said frame.

19. In a scale, the combination of a scale-beam, counterbalancing means operatively connected to said scale-beam, and means to cause said counterbalancing means to move in equal steps when equal increments of weight are placed on the scale; said means consisting of a cylinder containing mercury or other suitable liquid, a plunger, and means to adjust said cylinder in relation to said plunger.

20. In a scale, the combination of a pendulum and a plunger device to cause said pendulum to move in equal steps when equal increments of weight are placed upon the scale; said plunger device comprising a receptacle containing mercury or other suitable liquid and a plunger, having a variable cross-section, suspended from above and adapted to move up and down in said liquid.

21. In a scale, the combination of a scale-beam, a pendulum operatively connected thereto, and a plunger device to cause said pendulum to move in equal steps when equal increments of weight are placed upon the scale; said plunger device consisting of a receptacle containing mercury or other suitable liquid and a submersible member, having a variable cross-section and suspended from the said scale-beam.

22. In a scale, the combination of a pendulum and a plunger device to cause said pendulum to swing uniformly; said plunger device consisting of a cylinder containing mercury or other suitable liquid, and a plunger suspended from the scale-beam and adapted to move up and down in said liquid; the configuration of said plunger being such that the resistance of the liquid exactly compensates for the variation in the movement of the said pendulum and causes it to move in equal steps when equal increments of weight are placed upon the scale.

23. In a scale, the combination of a scale-beam, a pendulum operatively connected thereto, a cylinder containing mercury or other suitable liquid, and a plunger suspended from said scale-beam and of such configuration that when immersed in said liquid by the movement of said scale-beam, the resistance offered by said liquid compensates for the tendency to irregularity in the movement of the said pendulum and causes it to move in arcs proportional to the weight placed upon the scale.

24. In a scale, means for adjusting said rod and said frame, and a plunger device operatively connected to said pendulum to cause it to move in equal steps when equal increments of weight are placed upon the scale; said plunger device comprising a vertically-adjustable cylinder containing mercury or other suitable liquid, a plunger suspended from above and so arranged as to be immersed in said liquid, and a hood mounted on said plunger and inclosing said cylinder.

25. In a scale, the combination of a scale-beam, a pendulum operatively connected thereto, a vertically-adjustable cylinder, a plunger depending from said scale-beam and adapted to be immersed in mercury or other suitable liquid contained in said cylinder whenever said scale-beam is depressed, and a hood mounted on said plunger and inclosing the upper end of said cylinder.

26. In a scale, the combination of a scale-beam, a pendulum operatively connected thereto, a weight-indicating device, means to operate said device, a frame supported on said scale-beam and carrying said operating means, and a plunger device to cause said pendulum to move in equal steps when equal increments of weight are placed upon the scale; said plunger device comprising a receptacle containing mercury or other suitable liquid and a submersible member having a variable cross-section.

27. In a scale, the combination of a scale-beam, a pendulum, a drum rotatably mounted on a shaft and marked to indicate weight, said shaft, a spindle mounted on each end of said shaft, rack-bars enmeshing with said spindles, connecting means between said rack-bars, a frame supported on said scale-beam, means for adjusting said rod and said frame, and a plunger device to cause said pendulum to move a distance proportional to the weight on the scale-beam; said plunger device comprising a receptacle containing liquid and a submersible member having a varying cross-section.

28. The combination of a pendulum and a plunger device; said plunger device consisting of a receptacle containing liquid and a submersible member having a variable cross-section whereby the variable counterpoising effect of said submersible member when partially immersed in said liquid tends to compensate for the variability otherwise existing in the increment in counterpoising effect of the pendulum for equal increments in movement.

In testimony whereof I have hereunto set my hand, in the presence of two subscribing witnesses, this the 13th day of October, 1905.

ARTHUR W. BARNARD.

Witnesses:
E. F. UNIAC,
CHARLES F. RICHARDSON.